FERROELECTRIC AND PIEZOELECTRIC COMPOSITION

Filed Aug. 6, 1971 4 Sheets-Sheet 1

TRIANGULAR COMPOSITIONAL DIAGRAM
OF TERNARY SYSTEM
$Pb(In1/2Nb1/2)O_3$-$PbZr(1-u)Sn(u)O_3$-$PbTiO_3$

0<U≦1

TRIANGULAR COMPOSITIONAL DIAGRAM
OF TERNARY SYSTEM
$Pb(In1/2Nb1/2)O_3$-$PbZrO_3$-$PbTiO_3$(mol%)

INVENTORS
MITSUO OSADA
OSAMU KUMON
TATSUYA NISHIMOTO

BY Sughrue, Rothwell, Mion, Zinn & Macpeak
ATTORNEYS

TRIANGULAR COMPOSITIONAL DIAGRAM OF THE TERNARY SYSTEM $Pb(In_{1/2}Nb_{1/2})O_3-PbSnO_3-PbTiO_3$ (mol %)

INVENTORS
MITSUO OSADA
OSAMU KUMON
TATSUYA NISHIMOTO
BY
Sughrue, Rothwell, Mion, Zinn & Macpeak
ATTORNEYS VARIATION IN THE LONGITUDINAL COUPLING COEFFICIENT ($K_{33}$) AND THE DIELECTRIC CONSTANT (E) VERSUS Pb(In 1/2 Nb 1/2)$O_3$-$PbTiO_3$ CONCENTRATION VARIATION IN THE LONGITUDINAL COUPLING COEFFICIENT ($K_{33}$) AND THE DIELECTRIC CONSTANT (E) VERSUS $PbZrO_3$ CONCENTRATION [Pb(In 1/2 Nb 1/2)$O_3$ CONSTANT AT 10 mols %]

FERROELECTRIC AND PIEZOELECTRIC COMPOSITION

Filed Aug. 6, 1971 4 Sheets-Sheet 4

United States Patent Office 3,766,073
Patented Oct. 16, 1973

3,766,073

FERROELECTRIC AND PIEZOELECTRIC COMPOSITION

Mitsuo Osada and Osamu Kumon, Osaka, and Tatsuya Nishimoto, Nishinomiya, Japan, assignors to Sumitomo Electric Industries, Ltd., Osaka, Japan Continuation-in-part of abandoned application Ser. No. 795,001, Jan. 29, 1969. This application Aug. 6, 1971, Ser. No. 169,709
Claims priority, application Japan, Jan. 29, 1968, 43/5,589; Feb. 20, 1968, 43/10,973; Apr. 29, 1968, 43/12,676
The portion of the term of the patent subsequent to Dec. 28, 1988, has been disclaimed
Int. Cl. C04b *35/46, 35/48*
U.S. Cl. 252—62.9 4 Claims

ABSTRACT OF THE DISCLOSURE

A ferroelectric and piezoelectric composition consisting essentially of a solid solution of the ternary system consisting of $Pb(In_{1/2}Nb_{1/2})O_3$-$PbZr_{(1-u)}Sn_uO_3$-$PbTiO_3$ wherein $O<u\leqq 1$ and wherein the amounts X, Y and Z of said $Pb(In_{1/2}Nb_{1/2})O_3$, $PbZr_{(1-u)}Sn_uO_3$ and $PbTiO_3$, respectively, in mole percent, with the total being 100 mole percent, vary within the figure ABCDEFGH shown in FIG. 1, is disclosed. The composition exhibits improved ferroelectric and piezoelectric properties in comparison to prior art compositions.

CROSS-REFERENCE TO RELATED APPLICATION

The present application is a continuation-in-part of U.S. application Ser. No. 795,001, filed Jan. 29, 1969 and entitled "Ferroelectric and Piezoelectric Composition," and now abandoned.

BACKGROUND OF THE INVENTION

Field of the invention

The invention relates to a novel ferroelectric and piezoelectric composition.

Description of the prior art

Ferroelectric and piezoelectric materials containing barium titanate, lead titanate zirconate and the like, as their principal constituents, are used in many diverse applications, such as transducers useful in devices such as wave filters for producing or sensing vibrations, elements for generating high voltage and the like.

Compositions comprising a ternary system consisting essentially of $Pb(In_{1/2}Nb_{1/2})O$-$PbZrO_3$-$PbTiO_3$ are known as can be seen by referring to our co-pending application Ser. No. 712,192, filed Mar. 9, 1968, entitled "Ferroelectric and Piezoelectric Composition."

It is also known that the resonate resistance (R) of such a composition can be reduced, and the dielectric constant ($\epsilon$) thereby increased, by replacing a portion of the $Pb^{+2}$ with an alkaline earth metal. This, in turn, results in an increase in the mechanical quality factor (Q*m*), since the reasonate resistance (R) is inversely related to the mechanical quality factor by the following expression:

$$Qm=\frac{1}{2\pi(fa-fr)CR}$$

where *fr* is resonate frequency, *fa* is inverse resonate frequency, R is impedance and C is capacitance. In addition, it is well known that the coupling coefficient ($k_{33}$) is directly propiortional to (*fa—fr*).

However, prior art attempts to increase the mechanical quality factor (Q*m*) by replacing a portion of the $Pb^{+2}$ with an alkaline earth metal have resulted in a significant decrease in dielectric constant ($\epsilon$) and/or longitudinal coupling coefficient ($k_{33}$). Thus, in U.S. Pat. No. 2,906,710 to Kulcsar et al., the dielectric constant ($\epsilon$) and mechanical quality factor (Q*m*) are increased by replacing a portion of $Pb^{+2}$ with $Sr^{+2}$ or $Ca^{+2}$, but the coupling coefficient ($k_{33}$) is markedly reduced; in addition, the maximum dielectric constant ($\epsilon$) is only about 1300.

Accordingly, it is a primary object of the present invention to provide ferroelectric and piezoelectric compositions which have an improved mechanical quality factor (Q*m*) but not at the expense of a markedly reduced dielectric constant ($\epsilon$) or longitudinal coupling coefficient ($k_{33}$).

It is another object of the present invention to provide a ferroelectric and piezoelectric composition which exhibits an improved mechanical quality factor (Q*m*) without the need for substituting a portion of the $Pb^{+2}$ with an alkaline earth metal as in prior art compositions.

Other objects and advantages will become apparent from the ensuing description.

SUMMARY OF THE INVENTION

The present invention provides a ferroelectric and piezoelectric material characterized by intense ferroelectric and piezoelectric properties which are obtained by applying a DC voltage to a sintered ceramic material in the same manner by which ceramics of barium titanate or lead titanate zirconate are made, thereby polarizing the ceramic and providing a residual polarization to the ceramic. This property enables the ceramic to be advantageously used in transducers in all types of electrical devices. The ferroelectric and piezoelectric material of the present invention consists essentially of a solid solution of the ternary system consisting of $$Pb(In_{1/2}Nb_{1/2})\text{-}PbZr_{(1-u,}Sn_uO_3\text{-}PbTiO_3$$

wherein $O<u\leqq 1$ and wherein the amounts X, Y and Z of said $Pb(In_{1/2}Nb_{1/2})O_3$, $PbZr_{(1-u)}Sn_uO_3$ and $PbTiO_3$, respectively, in mole percent, with the total being 100 mole percent, vary within the figure ABCDEFGH shown in FIG. 1. The values of the amount of the components defining the figure ABCDEFGH in FIG. 1 are as follows:

| | $Pb(In_{1/2}Nb_{1/2})O_3$ (X) | $PbZr_{(1-u)}Sn_uO_3$ (Y) | $PbTiO_3$ (Z) |
|---|---|---|---|
| Point: | | | |
| A | 75 | 0 | 25 |
| B | 60 | 10 | 30 |
| C | 10 | 60 | 30 |
| D | 5 | 55 | 40 |
| E | 5 | 45 | 50 |
| F | 15 | 30 | 55 |
| G | 30 | 15 | 55 |
| H | 55 | 0 | 45 |

ternary system is varied.

Figure 6:
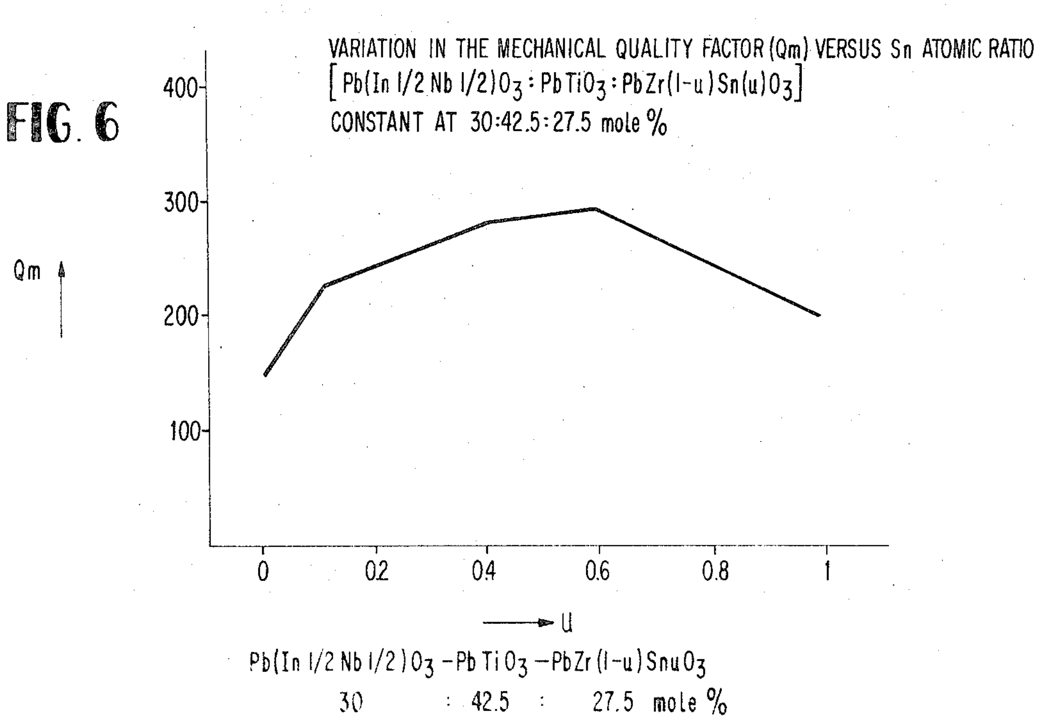

FIG. 6 indicates the variations in the mechanical quality factor ($Qm$) of the material produced in accordance with the present invention when the atomic ratio of Sn in $$Pb(In_{1/2}Nb_{1/2})O_3:PbTiO_3:PbZr_{(1-u)}Sn_uO_3=30:42.5:27.5$$

is varied.

DETAILED DESCRIPTION OF THE PREFERRED EMBODIMENTS

The material produced in accordance with the present invention comprises $$Pb(In_{1/2}Nb_{1/2})O_3\text{-}PbTiO_3\text{-}PbZr_{(1-u)}Sn_uO_3$$

wherein $O<u\leqq 1$.

The ceramics made in accordance with the ternary system of the present invention possess piezoelectric properties. However, considering the commercial aspects, the subject matter of the present invention is directed to the following ranges of each constituent of the material referred to in the diagram in FIG. 1:

| | | |
|---|---|---|
| X------ | $Pb(In_{½}Nb_{½})O_3$ | X=5, 75 mol percent. |
| Y------ | $PbTiO_3$ | Y=25, 55 mol percent. |
| Z------- | $PbZr(_{-M}Sn_uO_3$ | Z=0, 60 mol percent. |

wherein $X+Y+Z=100$, $O<u\leqq 1$.

The values of the coupling coefficient $k_{33}$ and the dielectric constant $\epsilon$ of the material are maximum at positions adjacent to the phase boundaries of $$Pb(In_{1/2}Nb_{1/2})O_3$$

Figure 1:
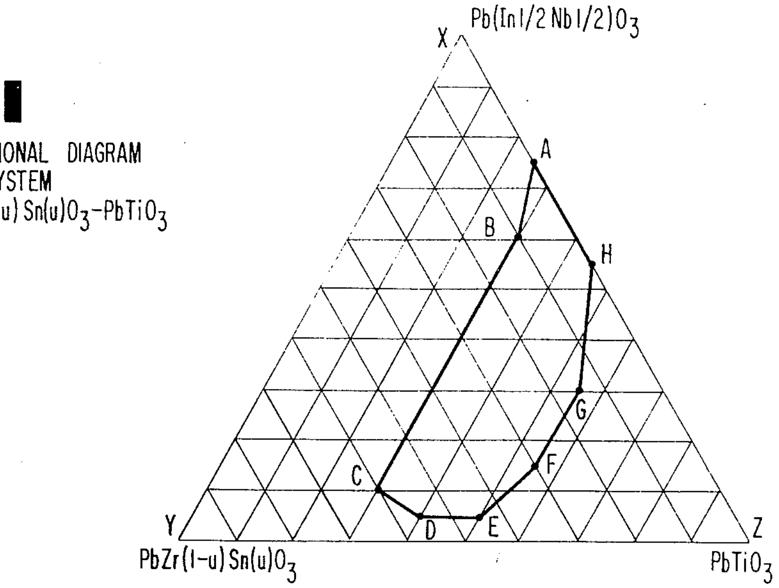
FIG. 1 is a triangular compositional diagram illustrating the various embodiments of the present invention.
Figure 2A:
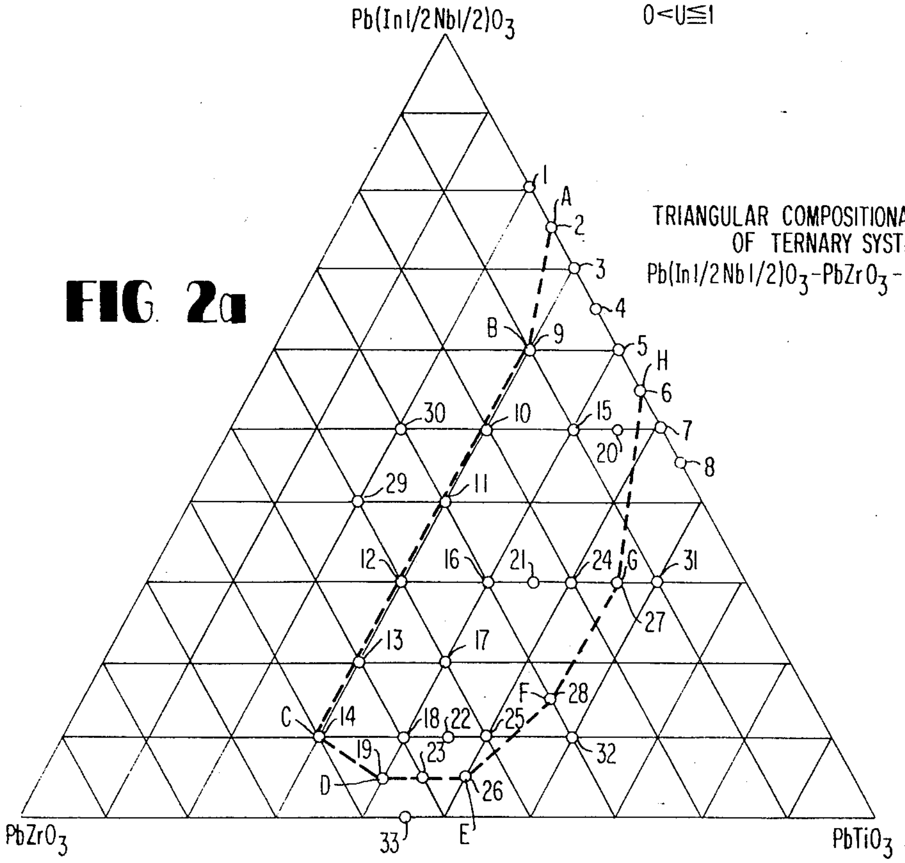
FIGS. 2(a) and (b) are triangular compositional diagrams illustrating the sample numbers of Table 1.
Figure 2B:
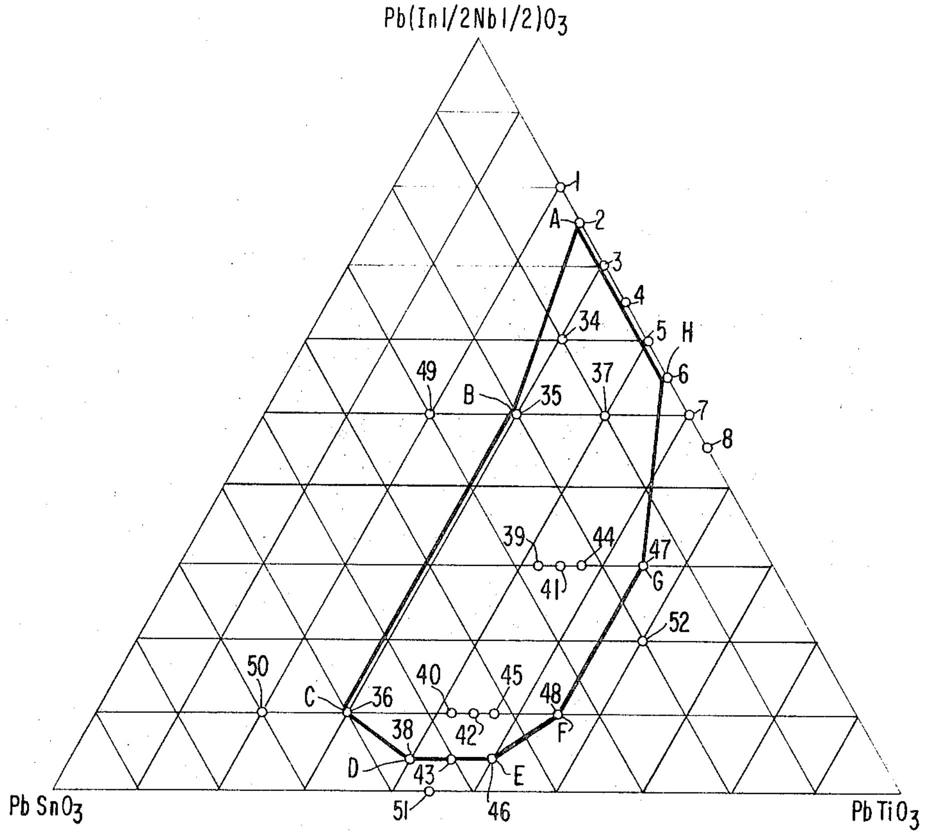

$PbTiO_3$ and $PbZr_{(1-u)}Sn_uO_3$ as shown in the ternary system of FIG. 1, i.e., the above values are maximum when the mol percent of each constituent falls on the lines connecting each of the middle points of sample numbers 38–46, 40–45, 39–44 and 3–5, as shown in FIG. 2(b). The above values decrease as the composition of the materials is varied from the above described regions. From an industrial viewpoint, the preferred composition in accordance with the present invention is within the range as shown by the figure ABCDEFGH in FIG. 1.

The values of the coupling coefficient $k_{33}$ and dielectric constant $\epsilon$ are maximum at the following points, as indicated above:

[Mole percent]

| $Pb(In_{½}Nb_{½})O_3$ (X) | $PbZr_{(1-u)}Sn_uO_3$ (Y) | $PbTiO_3$ (Z) |
|---|---|---|
| 5 | 50 | 45 |
| 10 | 45 | 45 |
| 30 | 25 + | 45 |
| 50 | 10 + | 40 |
| 65 | 0 | 35 |

In other words, the values of the coupling coefficient $k_{33}$ and dielectric constant $\epsilon$ are maximum within the following compositions:

[Mole percent]

| $Pb(In_{½}Nb_{½})O_3$ (X) | $PbZr_{(1-u)}Sn_uO_3$ (Y) | $PbTiO_3$ (Z) |
|---|---|---|
| 5 | 40-50 | 40-50 |
| 10 | 42.5-47.5 | 42.5-47.5 |
| 30 | 22.5-27.5 | 42.5-47.5 |
| 60-70 | 0 | 30-40 |

The composition containing $Pb(In_{1/2}Nb_{1/2})O_3$ is superior from the viewpoint of facility of sintering and polarization of the material in comparison with the binary system consisting of $PbTiO_3$-$PbZrO_3$. Further, the Curie point of the composition containing $Pb(In_{1/2}Nb_{1/2})O_3$ is higher than that of the composition which does not contain $Pb(In_{1/2}Nb_{1/2})O_3$. The Curie point of composition sample number 17 is about 50° C. higher than that of a binary system in which the ratio of Zr to Ti is kept at about the same ratio as that of sample number 17. Accordingly, the lower limit of the composition wherein the inclusion of $Pb(In_{1/2}Nb_{1/2})O_3$ is recognized to give advantageous results is represented by C–D–E–F in FIG. 1.

The atomic ratio of Sn providing the highest mechanical quality factor $Qm$ is found between $O<u\leqq 1$ in the composition $PbZr_{(1-u)}Sn_uO_3$ as shown in FIG. 6.

Resonate resistance R is decreased by the replacement of $Pb^{+2}$ with $Sr^{+2}$, $Ca^{+2}$ and $Ba^{+2}$ as shown in Table 3 and this low resistance makes the composition suitable for a device such as a ceramic wave filter.

In preparing the ceramic in accordance with the present invention, oxides such as $In_2O_3$, $Nb_2O_5$, $TiO_2$, $ZrO_2$, $SnO_2$, and the carbonates of the peroxides thereof which can easily be decomposed by heating to form the oxides may be utilized as raw materials. Since $ZrO_2$ usually contains a small amount of hafnium, it is possible to replace Zr by hafnium in the present invention. However, since hafnium is expensive in comparison with Zr, the selection of the constituents should be made from an industrial viewpoint.

EXAMPLE

The oxides in Table 1 were used as raw materials in powdered form since these were commercially available at a purity greater than 99.5%. The oxides were mixed together after each of the oxides was weighed to obtain the weight ratio shown in Table 1. The mixture was then dried, and heated at 800° C. for two hours so as to effect a temporary sintering thereof.

The temporarily sintered material was coarsely crushed, finely powdered and wet blended in a ball mill for 20 hours.

After the powdering and blending, an organic caking agent was added to the powder, and the thus prepared mixture was pressed so as to form a cylindrical shape having a diameter of 6 mm. and a length of 18 mm. The thus formed body was sintered in a platinum casing at a temperature ranging from 1230 to 1270° C. for three hours within an atmosphere of lead. The sintered body was ground into a cylindrical shape having a diameter of 5 mm. and a length of 15 mm. with the opposite ends of the body being glazed with silver paint.

The thus formed element was polarized by applying a DC voltage of 2.5 kv./mm. in silicone oil at a temperature of 100° C. At 100 hours from the time of polarization of the element, the physical properties of the element were measured by the methods defined by IRE standards. Table 1 shows the test results, the longitudinal coupling coefficient being indicated by $k_{33}$ and the dielectric constant being indicated by $\epsilon$.

Figure 3:
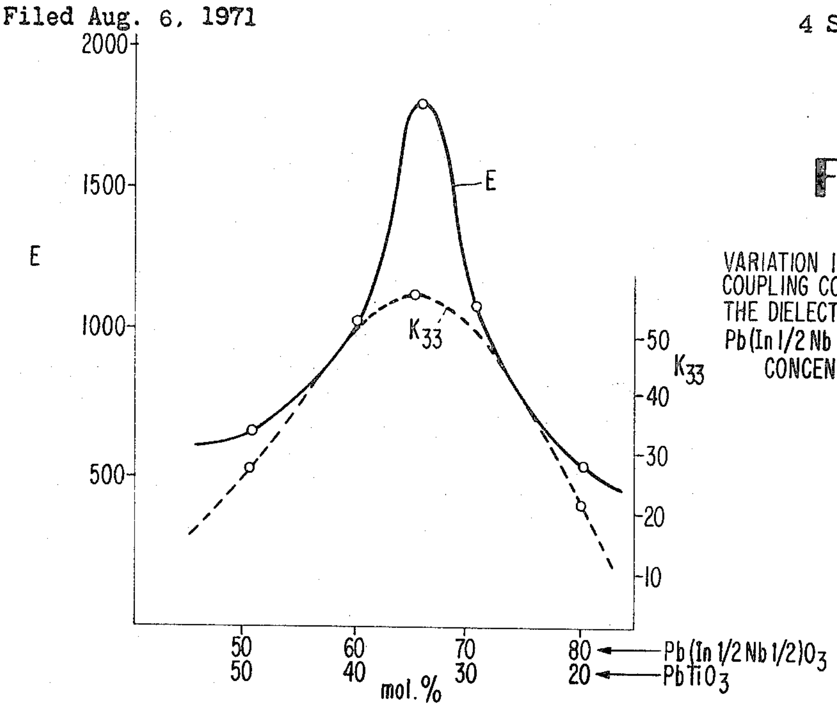
FIG. 3 indicates the variations in the longitudinal coupling coefficient and the dielectric constant, respectively, of the material produced in accordance with the present invention when the ratio of lead titanate with respect to lead indate niobate is varied.
Figure 4A:
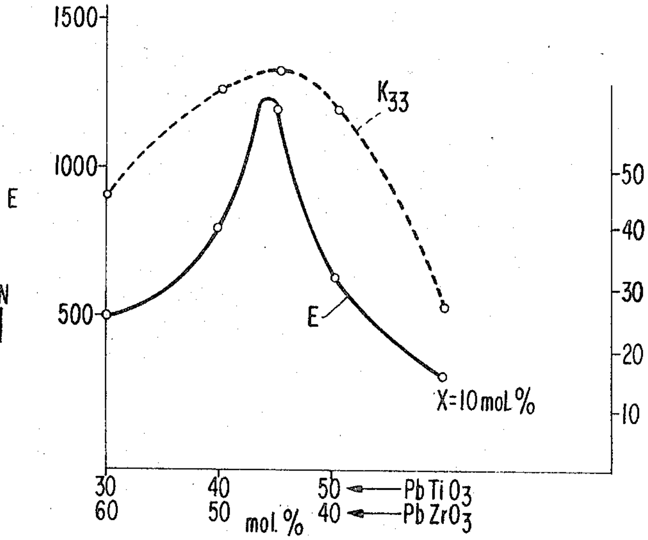
FIGS. 4(a), (b) and (c) indicate the variations in the longitudinal coupling coefficient and the dielectric constant, respectively, of the material produced in accordance with the present invention when the ratio of lead titanate with respect to lead zirconate or lead stannate is varied and the content of lead indate niobate in the material is held to 10 mol percent (a), (b), and 30 mole percent (c).
Figure 4B:
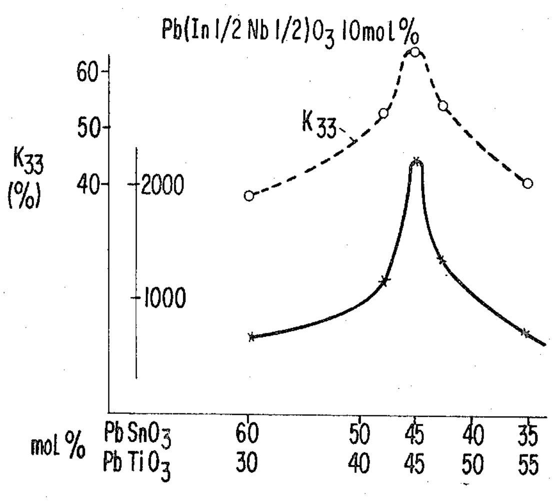
Figure 4C:
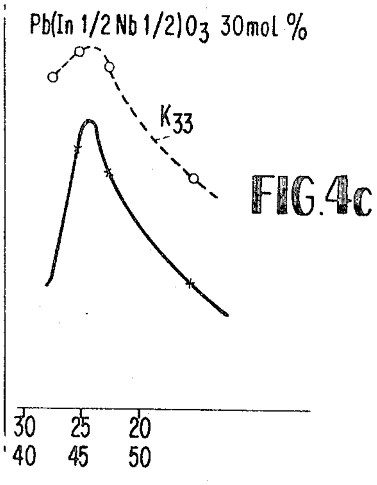
Figure 5:
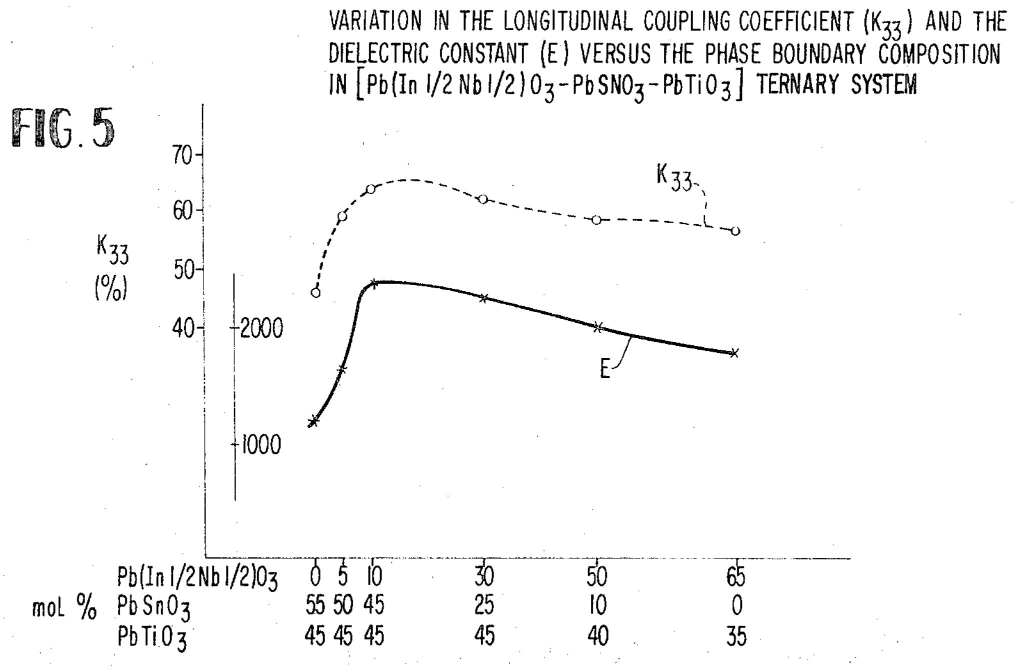
FIG. 5 indicates the variations in the longitudinal coupling coefficient and the dielectric constant of the material produced in accordance with the present invention when the phase boundary composition in the $$Pb(In_{1/2}Nb_{1/2})O_3\text{-}PbTiO_3\text{-}PbSnO_3$$

The variation in properties due to the change in the ratio of $Pb(In_{1/2}Nb_{1/2})O_3$ with respect to $PbTiO_3$ is shown in FIG. 3. The variation in the properties due to the change in the ratio of $PbZrO_3$ or $PbSnO_3$ with respect to $PbTiO_3$ when the content of $Pb(In_{1/2}Nb_{1/2})O_3$ is kept at 10 mol percent are shown in FIGS. 4(a) and (b) and at 30 mol percent is shown in FIG. 4(c).

The variation of the properties ($k_{33}$ and $Qm$) due to the change in the atomic ratio of Sn in the $$Pb(In_{1/2}Nb_{1/2})O_3\text{-}PbTiO_3\text{-}PbZr_{(u-1)}Sn_uO_3$$

ternary system is shown in Table 2.

The variation of the mechanical quality factor $Qm$ due to the change in the atomic ratio of Sn with respect to Zr when the composition of the $$Pb(In_{1/2}Nb_{1/2})O_3:PbTiO_2:PbZr_{(1-u)}Sn_uO_3$$

mol fraction is kept at 30:52.5 is shown in FIG. 6.

TABLE 1

(Composition-properties (Refer to Fig. 1, Fig. 2a, 2b)

| Sample No. | Composition, mol percent | | | | Sintering temp. (° C.) | $k_{33}$ (percent) | $\epsilon$ |
|---|---|---|---|---|---|---|---|
| | $Pb(In_{1/2}Nb_{1/2})O_3$ | $PbTiO_3$ | $PbZrO_3$ | $PbSnO_3$ | | | |
| 1 | 80 | 20 | 0 | 0 | 1,230 | 22 | 500 |
| 2 | 75 | 25 | 0 | 0 | 1,230 | 40 | 810 |
| 3 | 70 | 30 | 0 | 0 | 1,230 | 52 | 1,100 |
| 4 | 65 | 35 | 0 | 0 | 1,250 | 57 | 1,800 |
| 5 | 60 | 40 | 0 | 0 | 1,250 | 50 | 1,020 |
| 6 | 55 | 45 | 0 | 0 | 1,250 | 40 | 800 |
| 7 | 50 | 50 | 0 | 0 | 1,250 | 27 | 680 |
| 8 | 45 | 55 | 0 | 0 | 1,250 | 12 | 580 |
| 9 | 60 | 30 | 10 | 0 | 1,250 | 42 | 870 |
| 10 | 50 | 30 | 20 | 0 | 1,250 | 41 | 500 |
| 11 | 40 | 30 | 30 | 0 | 1,250 | 42 | 550 |
| 12 | 30 | 30 | 40 | 0 | 1,250 | 45 | 420 |
| 13 | 20 | 30 | 50 | 0 | 1,250 | 46 | 530 |
| 14 | 10 | 30 | 60 | 0 | 1,270 | 45 | 500 |
| 15 | 50 | 40 | 10 | 0 | 1,250 | 53 | 760 |
| 16 | 30 | 40 | 30 | 0 | 1,250 | 61 | 1,100 |
| 17 | 20 | 40 | 40 | 0 | 1,250 | 56 | 630 |
| 18 | 10 | 40 | 50 | 0 | 60 | 60 | 320 |
| 19 | 5 | 40 | 55 | 0 | 1,270 | 45 | 550 |
| 20 | 50 | 45 | 5 | 0 | 1,250 | 45 | 750 |
| 21 | 30 | 45 | 25 | 0 | 1,250 | 62 | 1,150 |
| 22 | 10 | 45 | 45 | 0 | 1,250 | 64 | 1,220 |
| 23 | 5 | 45 | 50 | 0 | 1,270 | 53 | 920 |
| 24 | 30 | 50 | 20 | 0 | 1,250 | 42 | 610 |
| 25 | 10 | 50 | 40 | 0 | 1,250 | 38 | 570 |
| 26 | 5 | 50 | 45 | 0 | 1,250 | 62 | 630 |
| 27 | 30 | 55 | 15 | 0 | 1,250 | 39 | 600 |
| 28 | 15 | 55 | 30 | 0 | 1,270 | 41 | 740 |
| 29 | 40 | 20 | 40 | 0 | 1,250 | 37 | 470 |
| 30 | 50 | 20 | 30 | 0 | 1,250 | 35 | 450 |
| 31 | 30 | 60 | 10 | 0 | 1,250 | 25 | 420 |
| 32 | 10 | 60 | 30 | 0 | 1,250 | 27 | 300 |
| 33 | 0 | 45 | 55 | 0 | 1,270 | 45 | 770 |
| 34 | 60 | 30 | 0 | 10 | 1,270 | 45 | 1,010 |
| 35 | 50 | 30 | 0 | 20 | 1,270 | 39 | 980 |
| 36 | 10 | 30 | 0 | 60 | 1,250 | 38 | 660 |
| 37 | 50 | 40 | 0 | 10 | 1,230 | 59 | 2,020 |
| 38 | 5 | 40 | 0 | 55 | 1,250 | 46 | 790 |
| 39 | 30 | 42.5 | 0 | 27.5 | 1,230 | 58 | 1,140 |
| 40 | 10 | 42.5 | 0 | 47.5 | 1,250 | 52 | 1,100 |
| 41 | 30 | 45 | 0 | 25 | 1,230 | 62 | 2,290 |
| 42 | 10 | 45 | 0 | 45 | 1,250 | 64 | 2,420 |
| 43 | 5 | 45 | 0 | 50 | 1,250 | 60 | 1,580 |
| 44 | 30 | 47.5 | 0 | 22.5 | 1,230 | 60 | 2,110 |
| 45 | 10 | 47.5 | 0 | 42.5 | 1,250 | 55 | 1,670 |
| 46 | 5 | 50 | 0 | 45 | 1,250 | 44 | 1,360 |
| 47 | 30 | 55 | 0 | 15 | 1,230 | 41 | 1,100 |
| 48 | 10 | 55 | 0 | 35 | 1,250 | 40 | 740 |
| 49 | 50 | 20 | 0 | 30 | 1,230 | 25 | 660 |
| 50 | 10 | 20 | 0 | 70 | 1,250 | 23 | 400 |
| 51 | 0 | 45 | 0 | 55 | 1,250 | 46 | 1,190 |
| 52 | 20 | 60 | 0 | 20 | 1,230 | 30 | 790 |

TABLE 2

| Sample | Composition, mol percent | | | $u$ | Sintering temperature, ° C. | $k_{33}$, percent | $\epsilon$ | $Qm$ |
|---|---|---|---|---|---|---|---|---|
| | $Pb(In_{1/2}Nb_{1/2})O_3$ | $PbTiO_3$ | $PbZr_{(1-u)}Sn_uO_3$ | | | | | |
| A | 10 | 45 | 45 | 0 | 1,250 | 64 | 1,220 | 90 |
| B | 10 | 45 | 45 | 0.2 | 1,250 | 65 | 1,250 | 110 |
| C | 10 | 45 | 45 | 0.4 | 1,250 | 63 | 1,500 | 160 |
| D | 10 | 45 | 45 | 0.6 | 1,250 | 66 | 1,700 | 150 |
| E | 10 | 45 | 45 | 0.8 | 1,250 | 64 | 2,000 | 120 |
| F | 10 | 45 | 45 | 1 | 1,250 | 64 | 2,420 | 50 |
| G | 30 | 42.5 | 27.5 | 0 | 1,280 | 60 | 1,200 | 150 |
| H | 30 | 42.5 | 27.5 | 0.2 | 1,280 | 58 | 1,100 | 240 |
| I | 30 | 42.5 | 27.5 | 0.4 | 1,280 | 59 | 1,150 | 280 |
| J | 30 | 42.5 | 27.5 | 0.6 | 1,280 | 57 | 1,130 | 300 |
| K | 30 | 42.5 | 27.5 | 0.8 | 1,280 | 57 | 1,100 | 240 |
| L | 30 | 42.5 | 27.5 | 1 | 1,230 | 58 | 1,140 | 200 |
| M | 50 | 42.5 | 7.5 | 0 | 1,280 | 58 | 1,500 | 80 |
| N | 50 | 42.5 | 7.5 | 0.2 | 1,280 | 59 | 1,550 | 150 |
| O | 50 | 42.5 | 7.5 | 0.4 | 1,280 | 58 | 1,650 | 300 |
| P | 50 | 42.5 | 7.5 | 0.8 | 1,280 | 56 | 1,620 | 320 |
| Q | 50 | 42.5 | 7.5 | 0.8 | 1,280 | 57 | 1,600 | 290 |
| R | 50 | 42.5 | ---------------- | 1 | 1,280 | 59 | 1,700 | 150 |

The compositions of sample Nos. 22, 39 and 42 in Table 1 correspond respectively to the compositions of Samples A, L and F in Table 2. It is seen from Table 2 that by replacing a portion of the Zr in the compositions of Samples A, L and F with Sn that the mechanical quality factor (Q*m*) is remarkedly increased (see Samples B–E and H–K, especially), but not at the expense of decreasing the coupling coefficient significantly. The increase in the mechanical quality factor (Q*m*) for the compositions where $Pb(In_{1/2}Nb_{1/2})O_3=50$ mole percent, when a portion of the Zr is replaced with Sn, is also shown in Table 2. These effects are realized by utilizing compositions falling within the figure ABCDEFGH in FIG. 1.

TABLE 3

| Composition (mole percent) | | | | | | | | |
|---|---|---|---|---|---|---|---|---|
| $Pb(In_{1/2}Nb_{1/2})O_3$ | $PbZrO_3$ | $PbSnO_3$ | $PbTiO_3$ | X | | $k_{33}$ | $\epsilon$ | R |
| 10 | 45 | 0 | 45 | -------- | 0 | 64 | 1,220 | 1,700 |
| 10 | 45 | 0 | 45 | $Ba^{+2}$ | 2.5 | 65 | 1,300 | 1,300 |
| 10 | 45 | 0 | 45 | $Ba^{+2}$ | 5 | 67 | 1,800 | 1,100 |
| 10 | 45 | 0 | 45 | $Ba^{+2}$ | 10 | 67 | 2,200 | 800 |
| 10 | 45 | 0 | 45 | $Ba^{+2}$ | 15 | 65 | 2,700 | 600 |
| 10 | 45 | 0 | 45 | $Ba^{+2}$ | 20 | 5 | 8,100 | 600 |
| 10 | 45 | 0 | 45 | $Sr^{+2}$ | 5 | 65 | 1,800 | 970 |
| 10 | 45 | 0 | 45 | Ca | 2.5 | 64 | 1,500 | 780 |
| 30 | 27.5 | 0 | 42.5 | -------- | 0 | 60 | 1,200 | 1,800 |
| 30 | 27.5 | 0 | 42.5 | $Ba^{+2}$ | 5 | 58 | 2,400 | 970 |
| 10 | 27 | 18 | 45 | -------- | 0 | 66 | 1,700 | 1,400 |
| 10 | 27 | 18 | 45 | $Ba^{+2}$ | 5 | 65 | 2,200 | 900 |

R = Resonate resistance (Ω); X = Atomic percent of $Pb^{+2}$ replaced with $Ba^{+2}$, $Sr^{+2}$, and $Ca^{+2}$.

Sample numbers 2–6, and 34–48 and also sample numbers 9–28, wherein Sn partially replaces Zr, are included within the claims, whereas sample numbers 1, 7, 8, 29–33 and 49–52 are excluded from the claims although the latter illustrate the piezoelectric properties.

It is well known in the art that resonate resistance in a ceramic composed of the ternary system $PbZrO_3$-$PbTiO_3$-$PbSnO_3$ can be reduced, and the dielectric constant thereby increased, by replacing a portion of the $Pb^{+2}$ with an alkaline earth metal. A similar effect can be obtained in the ternary system $$Pb(In_{1/2}Nb_{1/2})O_3\text{-}PbTiO_3\text{-}PbZr_{(1-u)}Sn_uO_3$$

produced in accordance with the present invention by replacing a part (i.e., up to 25 atomic percent) of the $Pb^{+2}$ with an alkaline earth metal.

The variation in properties due to the substitution in the atomic ratio of $Pb^{+2}$ with $Sr^{+2}$, $Ba^{+2}$ and $Ca^{+2}$ is shown in Table 3. In this table resonate resistance R is measured employing samples having the same volume as in previous examples.

What is claimed is:

1. A ferroelectric and piezoelectric composition consisting essentially of a solid solution of the ternary system consisting of about 10 mole percent $Pb(In_{1/2}Nb_{1/2})O_3$, from about 42.5 to 47.5 mole percent $PbZr_{(1-u)}Sn_uO_3$ and from about 42.5 to 47.5 mole percent $PbTiO_3$, wherein $O<u\leq 1$ and wherein the total mole percent is 100 mole percent.

2. The composition of claim 1 wherein up to 25 atomic percent of the $Pb^{+2}$ is replaced by an alkaline earth metal.

3. A ferroelectric and piezoelectric composition consisting essentially of a solid solution of the ternary system consisting of about 30 mole percent $Pb(In_{1/2}Nb_{1/2})O_3$, from about 22.5 to 27.5 mole percent $PbZr_{(1-u)}Sn_uO_3$ and from about 42.5 to 47.5 mole percent $PbTiO_3$, wherein $O<u\leq 1$ and wherein the total mole percent is 100 mole percent.

4. The composition of claim 3 wherein up to 25 atomic percent of the $Pb^{+2}$ is replaced by an alkaline earth metal.

References Cited

UNITED STATES PATENTS

| | | | |
|---|---|---|---|
| 3,630,908 | 12/1971 | Osada et al. | 252—62.9 |
| 2,906,710 | 9/1959 | Kulcsar et al. | 252—62.9 |
| 3,468,800 | 9/1969 | Yokoyama et al. | 252—62.9 |
| 3,468,799 | 9/1969 | Kurihara et al. | 252—62.9 |

OTHER REFERENCES

Jaffe et al. "Journal of Research of the NBS," vol. 55, No. 5, November 1955, pp. 239, 241 and 245.

OSCAR R. VERTZ, Primary Examiner

J. COOPER, Assistant Examiner